(12) United States Patent
Rowitch (10) Patent No.: US 9,244,146 B2
(45) Date of Patent: Jan. 26, 2016

(54) POSITIONING BEACON TRANSMITTER

(71) Applicant: QUALCOMM Incorporated, San Diego, CA (US)

(72) Inventor: Douglas N Rowitch, Honolulu, HI (US)

(73) Assignee: QUALCOMM Incorporated, San Diego, CA (US)

(*) Notice: Subject to any disclaimer, the term of this patent is extended or adjusted under 35 U.S.C. 154(b) by 469 days.

(21) Appl. No.: 13/789,504

(22) Filed: Mar. 7, 2013

(65) Prior Publication Data

US 2014/0253383 A1 Sep. 11, 2014

(51) Int. Cl.
*G01S 1/08* (2006.01)
*G01S 1/02* (2010.01)
*G01S 5/02* (2010.01)

(52) U.S. Cl.
CPC ............... *G01S 1/02* (2013.01); *G01S 5/0226* (2013.01); *G01S 5/0236* (2013.01)

(58) Field of Classification Search
CPC ........... G01S 1/08; G01S 1/02; G01S 5/0226; G01S 5/0236
USPC ........................................................ 342/386
See application file for complete search history.

(56) References Cited

U.S. PATENT DOCUMENTS

| 7,528,716 | B2 | 5/2009 | Jackson |
| 7,751,829 | B2* | 7/2010 | Masuoka et al. ........... 455/456.1 |
| 2007/0201540 | A1 | 8/2007 | Berkman |
| 2012/0087212 | A1* | 4/2012 | Vartanian et al. ............. 367/118 |
| 2012/0315890 | A1* | 12/2012 | Suzuki et al. ............... 455/422.1 |

FOREIGN PATENT DOCUMENTS

| EP | 2009460 A1 | 12/2008 |
| EP | 2383901 A1 | 11/2011 |
| WO | 2011123336 A1 | 10/2011 |

OTHER PUBLICATIONS

International Search Report and Written Opinion—PCT/US2014/020443—ISA/EPO—May 26, 2014.

* cited by examiner

*Primary Examiner* — Harry Liu
(74) *Attorney, Agent, or Firm* — Berkeley Law and Technology Group, LLP (57) ABSTRACT

Disclosed are systems, methods and devices for configuring a beacon transmitter for use in positioning operations of mobile devices. A beacon transmitter may be connected to a utility grade power source at a power cable. The beacon transmitter may also demodulate one or more data signals transmitted over the power cable to at least partially define a configuration for the beacon transmitter.

25 Claims, 6 Drawing Sheets

POSITIONING BEACON TRANSMITTER

BRIEF DESCRIPTION

1. Field

Embodiments described herein are directed to mobile navigation techniques.

2. Information

Global navigation satellite systems (GNSSs) and other like satellite positioning systems have enabled navigation services for mobile handsets in outdoor environments. A number of technologies are under consideration to enable accurate indoor positioning at a mobile device including, for example, (a) high sensitivity GNSS, (b) WiFi positioning, (c) cellular positioning, (d) inertial sensor augmentation, (e) other beacon positioning (e.g., BT, UWB, RFID, NFC, etc.), just to name few examples. One particular technique may include the installation of beacons that transmit a beacon signal for acquisition by a mobile device. In one example technique, a mobile device acquiring the beacon signal may estimate its location based, at least in part, on information obtained from the acquired signal such as, for example, a location or identity of the beacon transmitting the beacon signal. Such a beacon signal may comprise any one of or a combination of an RF, audio or light signal.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Briefly, particular implementations are directed to a method comprising, at a positioning beacon transmitter: receiving an alternating current power signal from a utility-grade power source over a cable medium; receiving a provisioning signal from a provisioning entity over said cable medium, said provisioning signal comprising an indication of a location of said location beacon; and configuring said positioning beacon transmitter to transmit a beacon signal modulated, at least in part, by said indication of said location of said location beacon.

Another particular implementation is directed to a positioning beacon transmitter comprising: power circuitry to be connected to a cable medium to receive a utility-grade alternating current power signal; a demodulator to be connected to said cable medium to demodulate a data signal received on said cable medium; a wireless transmitter to transmit a beacon signal; and a processor to configure said wireless transmitter, in response to said demodulated data signal, to transmit said beacon signal modulated, at least in part, by said indication of said location of said positioning beacon transmitter.

Another particular implementation is directed to article comprising: a non-transitory storage medium comprising machine-readable instructions stored thereon which are executable by a special purpose computing apparatus of a positioning beacon transmitter to: obtain a provisioning signal received from a provisioning entity at a utility-grade power source over a cable medium connected to a utility-grade power source, the provisioning signal comprising an indication of a location of the positioning beacon transmitter; and configure the positioning beacon transmitter to transmit a beacon signal modulated, at least in part, by the indication of the location of the positioning beacon transmitter.

Another particular implementation is directed to an apparatus comprising: means for receiving an alternating current power signal from a utility-grade power source over a cable medium; means for receiving a provisioning signal from a provisioning entity over said cable medium, said provisioning signal comprising an indication of a location of said location beacon; and means for configuring a positioning beacon transmitter to transmit a beacon signal modulated, at least in part, by said indication of said location of said positioning beacon transmitter.

Another particular implementation is directed to a method comprising, at a provisioning entity: determining one or more commands for configuring one or more positioning beacon transmitters; modulating said one or more commands for transmission over wires for transmission of an alternating current power signal as utility-grade power source within a building; and transmitting said one or more commands as one or more provisioning signals over said wires to said one or more beacon transmitters, said one or more provisioning signals comprising an indication of locations of said positioning beacon transmitters.

Another particular implementation is directed to an apparatus comprising: a transceiver to transmit data signals over wires for transmission of an alternating current power signal as utility-grade power source within a building; and a processor to: determine one or more commands for configuring one or more positioning beacon transmitters; and initiate transmission of said one or more commands as one or more provisioning signals over said wires to said one or more positioning beacon transmitters, said one or more provisioning signals comprising an indication of locations of said positioning beacon transmitters.

Another particular implementation is directed to an article comprising: a storage medium comprising machine-readable instructions stored thereon which are executable by a special-purpose computing apparatus to: determine one or more commands for configuring one or more positioning beacon transmitters; and initiate transmission of said one or more commands as one or more provisioning signals over said wires for transmission of an alternating current power signal as a utility-grade power source within a building to said one or more beacon transmitters, said one or more provisioning signals comprising an indication of locations of said positioning beacon transmitters.

Another particular implementation is directed to an apparatus comprising: means for determining one or more commands for configuring one or more positioning beacon transmitters; means for modulating said one or more commands for transmission over wires for transmission of an alternating current power signal as utility-grade power source within a building; and means for transmitting said one or more commands as one or more provisioning signals over said wires to said one or more beacon transmitters, said one or more provisioning signals comprising an indication of locations of said positioning beacon transmitters.

It should be understood that the aforementioned implementations are merely example implementations, and that claimed subject matter is not necessarily limited to any particular aspect of these example implementations.

DETAILED DESCRIPTION

In particular implementations, a beacon may be configured or provisioned to transmit an appropriate beacon signal. A simple low-cost beacon may have a power cable to receive power from an external power source (e.g., a utility-grade wall outlet) but need not have a dedicated data communication port (e.g., wired Ethernet, Bluetooth, USB or WiFi port). Here, following installation of a beacon at a specific location over an area, a technician may manually program the individual beacon on-site to include, for example, the specific location. Multiple installations of beacons may entail a tedious task of manually provisioning beacons adding to cost of operation and increasing chances of faulty provisioning.

While having a power cable to receive power from an external power source but no dedicated data communication port, in particular implementations a beacon may be capable of receiving and/or responding to commands transmitted over the power cable by a central entity. In a particular implementation, these commands may be transmitted over the cable also used to receive power from an external power source using known power line signaling techniques including techniques developed by the HomePlug Powerline Alliance or according to IEEE Std. 1901-2010, IEEE Standard for Broadband over Power Line Networks: Medium Access Control and Physical Layer Specifications. Here, the power cable may be connected to an alternating current utility-grade power source such as a wall outlet or directly connected to a junction box, for example. For example, the alternating current utility-grade power source may be distributed by a circuit breaker panel through wiring in building walls, etc. A provisioning signal may be transmitted by a central provisioning entity over the same wiring concealed in building walls. A beacon transmitter connected to the wiring through a power cable may demodulate a received provisioning signal received on the power cable to configure the beacon accordingly. In one implementation, as discussed below with reference to FIG. 2, identifiable wiring extending from a central provisioning entity (e.g., on a corresponding breaker circuit) may transmit power to a particular room or adjacent rooms in a building. As such, the central positioning entity may address a particular beacon in the particular room or adjacent rooms through transmitting a provisioning signal on the identifiable wiring. In particular implementations, the beacon transmitter may be configured in this fashion to transit a particular power level for a beacon signal, modulate the beacon signal with a location of the beacon or a transmission power (e.g., in units of dB), or set or change a beacon's unique identifier.

Figure 1:
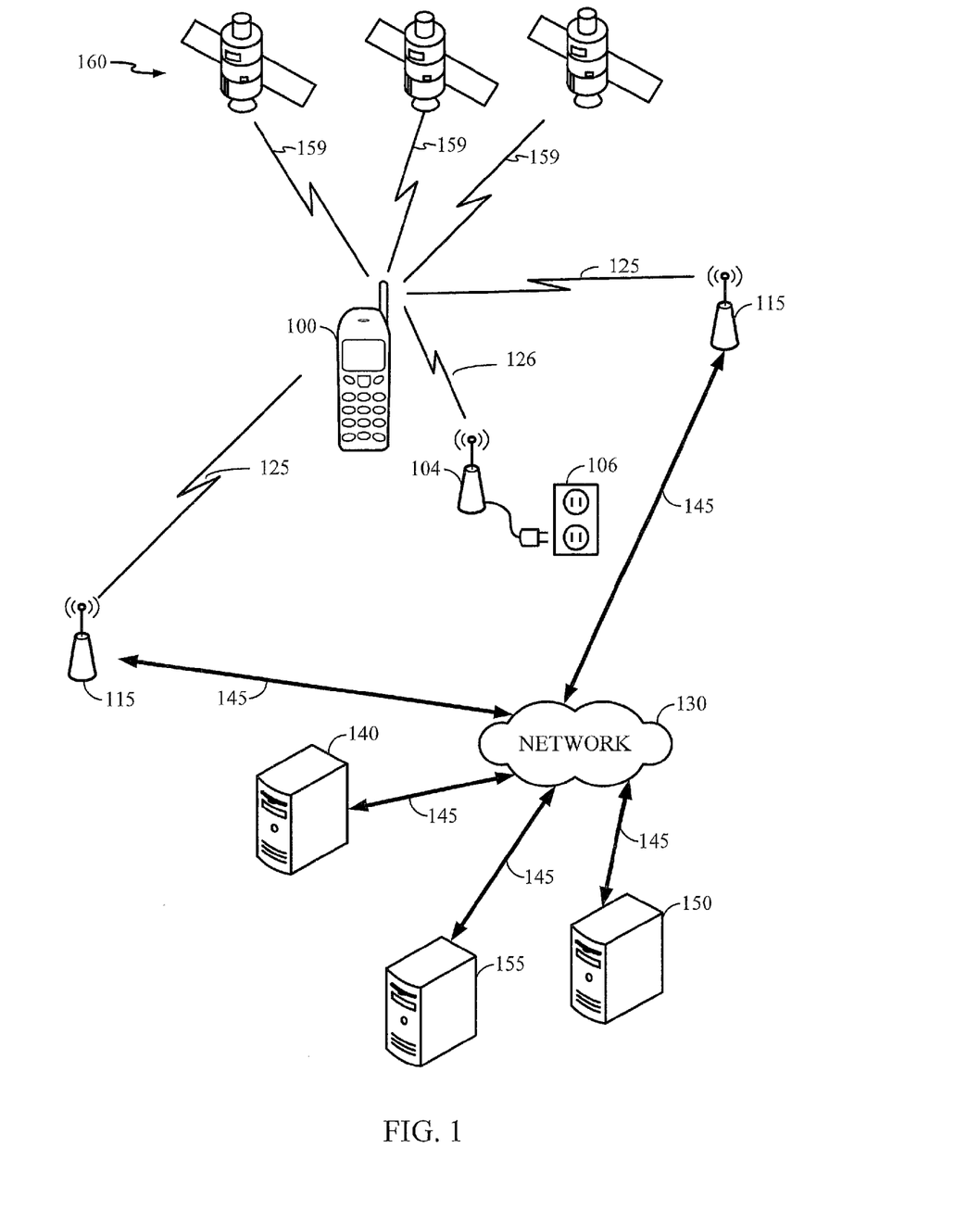
FIG. 1 is a system diagram illustrating certain features of a system containing a mobile device, in accordance with an implementation.

In certain implementations, as shown in FIG. 1, a mobile device 100 may receive or acquire satellite positioning system (SPS) signals 159 from SPS satellites 160. In some embodiments, SPS satellites 160 may be from one global navigation satellite system (GNSS), such as the GPS or Galileo satellite systems. In other embodiments, the SPS Satellites may be from multiple GNSS such as, but not limited to, GPS, Galileo, Glonass, or Beidou (Compass) satellite systems. In other embodiments, SPS satellites may be from any one several regional navigation satellite systems (RNSS') such as, for example, Wide Area Augmentation System (WAAS), European Geostationary Navigation Overlay Service (EGNOS), Quasi-Zenith Satellite System (QZSS), just to name a few examples.

In addition, mobile device 100 may transmit radio signals to, and receive radio signals from, a wireless communication network. In one example, mobile device 100 may communicate with a cellular communication network by transmitting wireless signals to, or receiving wireless signals from, base station transceiver over wireless communication links. Similarly, mobile device 100 may transmit wireless signals to, or receive wireless signals from local transceiver 115 over wireless communication link 125.

In a particular implementation, a local transceiver 115 may be configured to communicate with mobile device 100 at a shorter range over a wireless communication link than at a range enabled by a base station transceiver over a wireless communication link. For example, local transceiver 115 may be positioned in an indoor environment. Local transceiver 115 may provide access to a wireless local area network (WLAN, e.g., IEEE Std. 802.11 network) or wireless personal area network (WPAN, e.g., Bluetooth network).

In another example implementation, local transceiver 115 may comprise a femto cell transceiver capable of facilitating communication on wireless communication link 125 according to a cellular communication protocol. Of course it should be understood that these are merely examples of networks that may communicate with a mobile device over a wireless link, and claimed subject matter is not limited in this respect.

In a particular implementation, base station transceiver 110 and local transceiver 115 may communicate with servers 140, 150 and/or 155 over a network 130 through links 145. Here, network 130 may comprise any combination of wired or wireless links. In a particular implementation, network 130 may comprise Internet Protocol (IP) infrastructure capable of facilitating communication between mobile device 100 and servers 140, 150 or 155 through local transceiver 115 or base station transceiver 150. In another implementation, network 130 may comprise cellular communication network infrastructure such as, for example, a base station controller or master switching center (not shown) to facilitate mobile cellular communication with mobile device 100.

Mobile device 100 may also passively acquire wireless signals 126 transmitted by beacon transmitter 104. As discussed below, mobile device 100 may acquire signals from multiple transmitters (including beacon transmitter 104) to obtain a position fix or estimated location of mobile device 100. Here, beacon transmitter 104 may be programmed or configured to modulate at least a portion of wireless signal 126 125 based, at least in part, on an identity of beacon transmitter 104 (e.g., MAC address) and/or an estimated location of beacon transmitter 104). From acquisition of wireless signals 126, mobile device 100 may be capable of determining a location and/or identity of the beacon transmitter that transmitted the acquired wireless signal for computing an estimate of a location of mobile device 100.

In the particular illustrated implementation, beacon transmitter 104 may be powered by an alternating current (AC) power source such as utility outlet 106 (e.g., 120V at 60 Hz.). In addition, as described below, beacon transmitter 104 may communicate with another device over a cable connecting beacon transmitter 104 to utility outlet 106. In one particular implementation, beacon transmitter 104 may receive one or more signals to configure beacon transmitter 104 to support positioning operations for mobile device 100. For example, beacon transmitter 104 may be programmed to transmit wireless signals 126 at a particular carrier frequency or power level, modulate wireless signals 126 with certain information such as, for example, a location of the beacon transmitter 104, just to name a couple of examples.

In particular implementations, and as discussed below, mobile device 100 may have circuitry and processing resources capable of computing a position fix or estimated location of mobile device 100. For example, mobile device 100 may compute a position fix based, at least in part, on pseudorange measurements to four or more SPS satellites 160. Here, mobile device 100 may compute such pseudorange measurements based, at least in part, on pseudonoise code phase detections in signals 159 acquired from four or more SPS satellites 160. In particular implementations, mobile device 100 may receive from server 140, 150 or 155 positioning assistance data to aid in the acquisition of signals 159 transmitted by SPS satellites 160 including, for example, almanac, ephemeris data, Doppler search windows, just to name a few examples.

In other implementations, mobile device 100 may obtain a position fix by processing signals received from terrestrial transmitters fixed at known locations (e.g., such as base station transceiver 110) using any one of several techniques such as, for example, advanced forward trilateration (AFLT) and/or observed time difference of arrival (OTDOA). In these particular techniques, a range from mobile device 100 may be measured to three or more of such terrestrial transmitters fixed at known locations based, at least in part, on pilot signals transmitted by the transmitters fixed at known locations and received at mobile device 100. Here, servers 140, 150 or 155 may be capable of providing positioning assistance data to mobile device 100 including, for example, locations and identities of terrestrial transmitters to facilitate positioning techniques such as AFLT and OTDOA. For example, servers 140, 150 or 155 may include a base station almanac (BSA) which indicates locations and identities of cellular base stations in a particular region or regions.

In particular environments such as indoor environments or urban canyons, mobile device 100 may not be capable of acquiring signals 159 from a sufficient number of SPS satellites 160 or perform AFLT or OTDOA to compute a position fix. Alternatively, mobile device 100 may be capable of computing a position fix based, at least in part, on signals acquired from local transmitters (e.g., WLAN access points, femto cell transceivers, Bluetooth devices, etc., positioned at known locations). Such local transmitters may include local transceivers 115 and beacon transmitter 104. For example, mobile devices may obtain a position fix by measuring ranges to three or more indoor terrestrial wireless access points and/or beacons which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or round trip time (RTT) (e.g., for transceivers). In alternative implementations, mobile device 100 may obtain an indoor position fix by applying characteristics of acquired signals to a radio heatmap indicating expected RSSI and/or RTT signatures at particular locations in an indoor area. In particular implementations, a radio heatmap may associate identities of local transmitters (e.g., a MAC address which is discernible from a signal acquired from a local transmitter), expected RSSI from signals transmitted by the identified local transmitters, an expected RTT from the identified transmitters, and possibly standard deviations from these expected RSSI or RTT. It should be understood, however, that these are merely examples of values that may be stored in a radio heatmap, and that claimed subject matter is not limited in this respect.

In particular implementations, mobile device 100 may receive positioning assistance data for indoor positioning operations from servers 140, 150 or 155. For example, such positioning assistance data may include locations and identities of transmitters positioned at known locations to enable measuring ranges to these transmitters based, at least in part, on a measured RSSI and/or RTT, for example. Other positioning assistance data to aid indoor positioning operations may include radio heatmaps, locations and identities of transmitters, routeability graphs, just to name a few examples. Other assistance data received by the mobile device may include, for example, local maps of indoor areas for display or to aid in navigation. Such a map may be provided to mobile device 100 as mobile device 100 enters a particular indoor area. Such a map may show indoor features such as doors, hallways, entry ways, walls, etc., points of interest such as bathrooms, pay phones, room names, stores, etc. By obtaining and displaying such a map, a mobile device may overlay a current location of the mobile device (and user) over the displayed map to provide the user with additional context.

In one implementation, a routeability graph and/or digital map may assist mobile device 100 in defining feasible areas for navigation within an indoor area and subject to physical obstructions (e.g., walls) and passage ways (e.g., doorways in walls). Here, by defining feasible areas for navigation, mobile device 100 may apply constraints to aid in the application of filtering measurements for estimating locations and/or motion trajectories according to a motion model (e.g., according to a particle filter and/or Kalman filter).

In addition to measurements obtained from the acquisition of signals from local transmitters, according to a particular embodiment, mobile device 100 may further apply a motion model to measurements or inferences obtained from inertial sensors (e.g., accelerometers, gyroscopes, magnetometers, etc.) and/or environment sensors (e.g., temperature sensors, microphones, barometric pressure sensors, ambient light sensors, camera imager, etc.) in estimating a location or motion state of mobile device 100.

According to an embodiment, mobile device 100 may access indoor navigation assistance data through servers 140, 150 or 155 by, for example, requesting the indoor assistance data through selection of a universal resource locator (URL). In particular implementations, servers 140, 150 or 155 may be capable of providing indoor navigation assistance data to cover many different indoor areas including, for example, floors of buildings, wings of hospitals, terminals at an airport, portions of a university campus, areas of a large shopping mall, just to name a few examples. Also, memory resources at mobile device 100 and data transmission resources may make receipt of indoor navigation assistance data for all areas served by servers 140, 150 or 155 impractical or infeasible, a request for indoor navigation assistance data from mobile device 100 may indicate a rough or course estimate of a location of mobile device 100. Mobile device 100 may then be provided indoor navigation assistance data covering areas including and/or proximate to the rough or course estimate of the location of mobile device 100.

Figure 2:
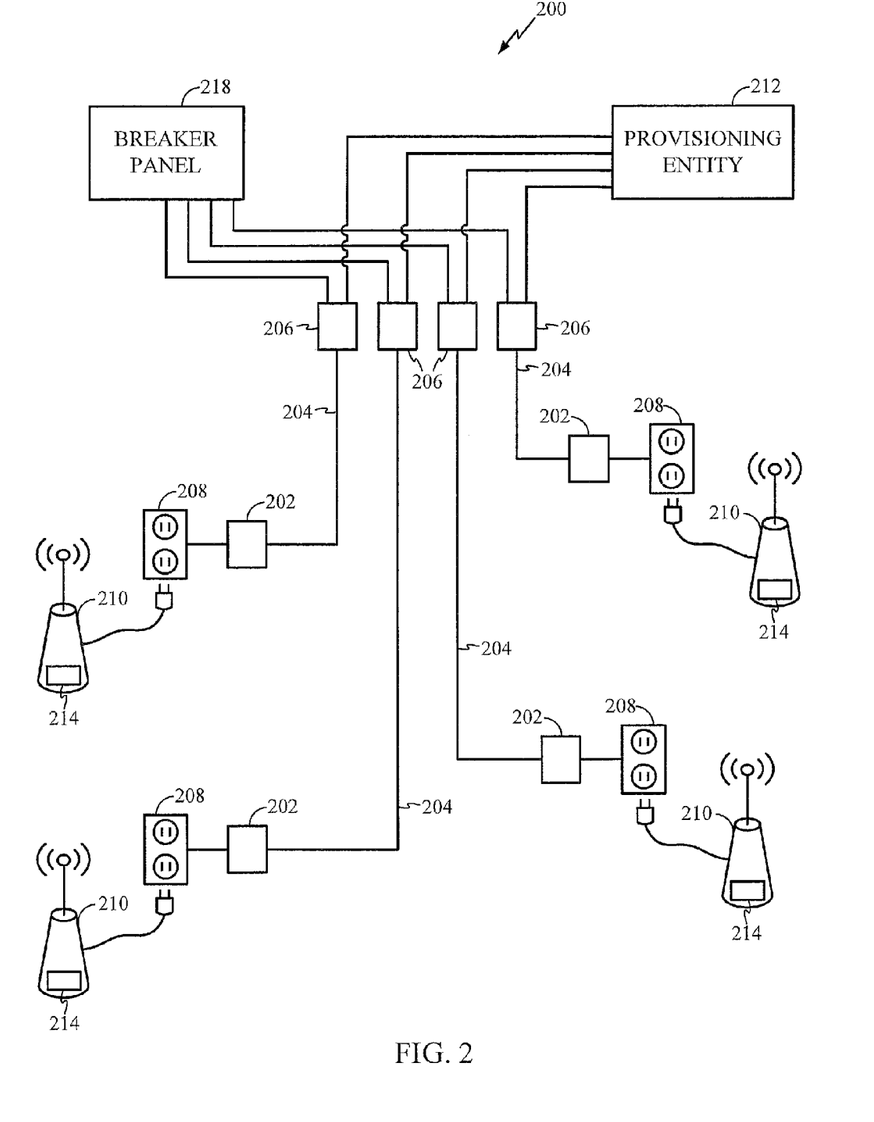
FIG. 2 is a schematic diagram of building infrastructure including utility power outlets coupled to a data transmitter according to an embodiment.

FIG. 2 is a schematic diagram of a utility power distribution system in a structure such as a building, for example. A breaker panel 218 may be connected to a power grid operated by an electrical utility company to distribute an AC power source through wiring 204 to junction boxes 202 and utility outlets 208. Wiring 204 may comprise construction-grade utility wiring. In addition to breaker panel 218, wiring 204 is also connected to a provisioning entity 212 capable of transmitting data signals through wiring 204 to junction boxes 202 and utility outlets 208. As shown, wiring 204 is coupled to both breaker panel 218 and provisioning entity 212 through splitters or connectors 206 permitting transmission of an AC power signal from breaker panel 218 and a data signal from provisioning entity 212 through wiring 204 and junction boxes 202 to utility outlets 208. Here, provisioning entity 212 may transmit data over wiring 204 in a band separate from the AC power signal using well known power line data transmission techniques such as those developed by HomePlug Powerline Alliance or according to IEEE Std. 1901-2010, IEEE Standard for Broadband over Power Line Networks: Medium Access Control and Physical Layer Specifications.

In the particular illustrated implementation, beacon transmitters 210 may be connected to utility outlets 208 through a power cable to receive the AC power signal and data transmitted from provisioning entity 212 using powerline data transmission techniques. In an alternative implementation (not shown), a power cable of a beacon transmitter 210 may be connected directly to a junction box (e.g., bypassing any exposed utility outlet). As discussed below, a power cable of a beacon transmitter 210 may be coupled to power conversion circuitry (e.g., AC/DC converter) and modulation/demodulation circuitry 214 capable of receiving messages from provisioning entity 212. In addition to receiving provisioning commands from provisioning entity 212, a beacon transmitter 210 may report operational status back to provisioning entity 212 including, for example, on/or, current power level, error codes, etc. Accordingly, wiring 204 may support bi-directional communication.

In a particular implementation, provisioning entity 212 may be capable of configuring or programming a beacon transmitter for use in positioning operations. As pointed out above in a particular implementation shown in FIG. 1, a beacon transmitter 210 may be capable of modulating a transmitted signal with particular information such as, for example, a location of the beacon transmitter 210. For example, a beacon transmitter 210 may transmit a beacon signal modulated by a unique identifier (e.g., MAC address) and a location of the beacon transmitter using any one of several well-known wireless signal modulation techniques. In one embodiment, a beacon transmitter 210 may be programmed with bits or values indicating the beacon transmitter's location (at a site or in a building, for example) based, at least in part, on a particular junction box 202 which is directly connected to the beacon transmitter 210.

In one implementation, provisioning entity 212 may be programmed with a priori knowledge of locations of junction boxes 202 connected to particular wiring 204. As such, provisioning entity 212 may program a beacon transmitter 210 connected to a particular junction box 202 (e.g., through a power cable and utility outlet 208) with a predetermined location of the particular junction box 202. The beacon transmitter 210 may then modulate a beacon signal with the predetermined location. In an alternative implementation, an individual junction box 202 may include circuitry capable of programming a connected beacon transmitter 210 with a location of the individual junction box 202, obviating a need for having a centralized positioning entity 212 to program the connected beacon transmitter 210. In another alternative implementation, a beacon transmitter 210 may be plugged into a wall outlet or be wired directly to a junction box. Provisioning entity 212 may then communicate with modulation/demodulation circuitry 214 of a beacon transmitter 210 to perform discovery of beacon nodes connected to a power distribution network. Here, provisioning entity 212 may transmit one or more probe signals over wiring 204 and listen for particular beacon transmitters to respond for registration.

As pointed out above, in one embodiment, a particular wiring 204 may be connected to a particular corresponding dedicated fuse or circuit breaker to transmit utility power to utility outlets 208 located in a particular room or adjacent rooms in a building. Accordingly, provisioning entity 212 may infer a location of a beacon transmitter 210 connected to the power distribution network through the particular wiring 204 to be connected to one of the utility outlets 208 located in the particular room or adjacent rooms. With a priori knowledge of the location of a destination utility outlet 208 (e.g., as being in a particular room or group of adjacent rooms) of a particular wiring 204, provisioning entity 212 may transmit a provisioning signal on the particular wiring 204 to beacon transmitters indicating the known location.

In one implementation, as shown in FIG. 2, provisioning entity 212 may have separate individual connections to particular individual wirings 204 for distributing power to a be preprogrammed by a technician at installation of provisioning entity 212 and/or breaker panel 218, during building construction or renovation for example. Here, specific locations, such as room location in latitude and longitude or other coordinates, may be programmed into provisioning entity 212.

In another implementation, provisioning entity 212 may be connected to an Internet Protocol (IP) service (not shown) and programmable through a web interface, for example. In one particular implementation, a technician or operator may survey a location of a room or adjacent rooms corresponding to a particular wiring 204 using, for example, a GNSS receiver or other receiver device to estimate locations of the rooms. Through the web interface, the technician may then program provisioning entity 212 to associate utility outlets 208 connected to the particular wiring 204 with the surveyed location.

In one implementation, provisioning entity 212 may provision a particular beacon transmitter 210 following discovery of connection of the particular beacon transmitter 212 to a utility outlet 208. In one implementation, a beacon transmitter 212 in response to receiving power (e.g., at a utility outlet 208) may commence transmitting a signal through a power cable to, for example, announce that it has been plugged into an outlet. For example the beacon transmitter 210 may transmit signals providing an identifier of the beacon transmitter 210 (e.g., unique MAC address) and/or describing capabilities of the beacon transmitter 210. A recipient provisioning entity 212 may then address provisioning signals to the beacon transmitter 210 to configure the beacon transmitter 212 accordingly. In another implementation, provisioning entity 212 may periodically transmit polling signals through a wiring 204 and listen for a response from a beacon transmitter 210 connected the wiring 204 including, for example, an identifier or description of capabilities of the connected beacon transmitter 210.

In a particular implementation scenario, a multiple beacon transmitters 210 may be connected to the same wiring 204. With knowledge of particular addresses or identifiers of the different beacon transmitters (e.g., obtained using one of the discovery techniques), provisioning entity 212 may individually address multiple different beacon transmitters 210 connected to the same wiring 204 by, for example, providing a header or other address indication on provisioning signals transmitted through the wiring 204.

Figure 3:
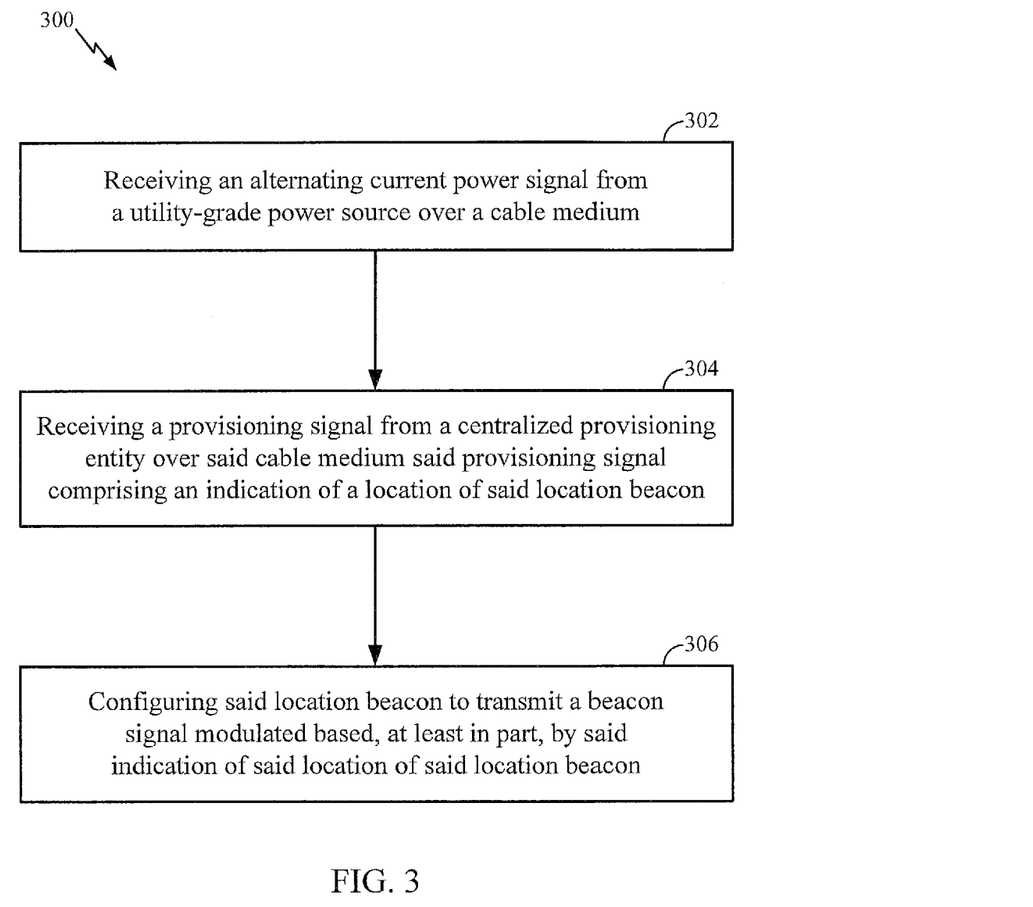
FIG. 3 is a flow diagram illustrating a method by a device in accordance with an implementation.

FIG. 3 is a flow diagram of a process of programming a beacon transmitter using power line signaling techniques according to an implementation. In one example implementation, the process of FIG. 3 may be performed by a beacon transmitter that is to be programmed with a location of the beacon transmitter to be used in modulating a beacon signal as discussed above. At block 302, a beacon transmitter may receive an alternating current power signals from a utility-grade power source (e.g., wall outlet or direct connection with a junction box) over a cable medium such as a power cable capable of plugging into a wall outlet. In addition, as pointed out above, the beacon transmitter may also receive a provisioning signal at block 304 from a centralized provisioning entity (e.g., provisioning entity 212) using power line data transmission techniques. The received provisioning signal may comprise an indication of a location of the beacon transmitter (e.g., relative/absolute position, altitude/floor), a desired transmission power level, selected frequency band, just to provide a few examples. At block 306, the beacon transmitter may be programmed or configured in response to the provisioning signal received at block 304 to transmit a beacon signal based, at least in part, by the indication of the location of the beacon transmitter. Mobile devices in the area may then be capable of incorporating acquisitions of the beacon signal in positioning operations.

Regarding controlling transmission power level for a beacon signal, a central entity (e.g., provisioning entity 212) may command different beacon transmitters to increase or decrease their respective transmission powers. In addition, the central entity may provision the different beacon transmitters to encode an indication of the transmission power level in a data signal modulating their respective beacon signals. Here, for example, a mobile acquiring beacon signals from these beacon transmitters may measure the received signal strength (RSSI) and can decode the transmit power from the beacon signal, it can better determine estimates of range.

According to an embodiment, having a central entity command different beacon transmitters to increase or decrease transmission power may enable a mobile device acquiring beacon signals from the beacon transmitters to tune a positioning solution within an indoor location. In one illustrative example, a mobile device moving through an indoor environment may measure beacon signals and received signal strength. This mobile device could be in communication with some central entity (server) that, in turn, may communicate with the beacon transmitters via power lines as described above. In addition, multiple such mobile devices may upload or report power observations. The central entity may then adjust transmission power levels of the various controlled beacon transmitters to enhance the effectiveness of positioning operations (e.g., by detecting beacon transmitters observed to be transmitting a beacon signal too strong and perhaps interfering with other beacons as candidates for a decrease in transmission power, or by detecting beacon transmitters that are observed to be too weak as candidates for an increase in transmission power). In another embodiment, the mobile device may comprise a technician tool capable of observing the strength of received beacon signals expected to be visible at an indoor location and adjust the powers (up/down as needed) to tune the beacons. In this mode, a technician using the tool may control multiple beacons transmitters around him indirectly (commands sent from mobile to central entity and then, via power line, to the identified beacons).

Figure 4:
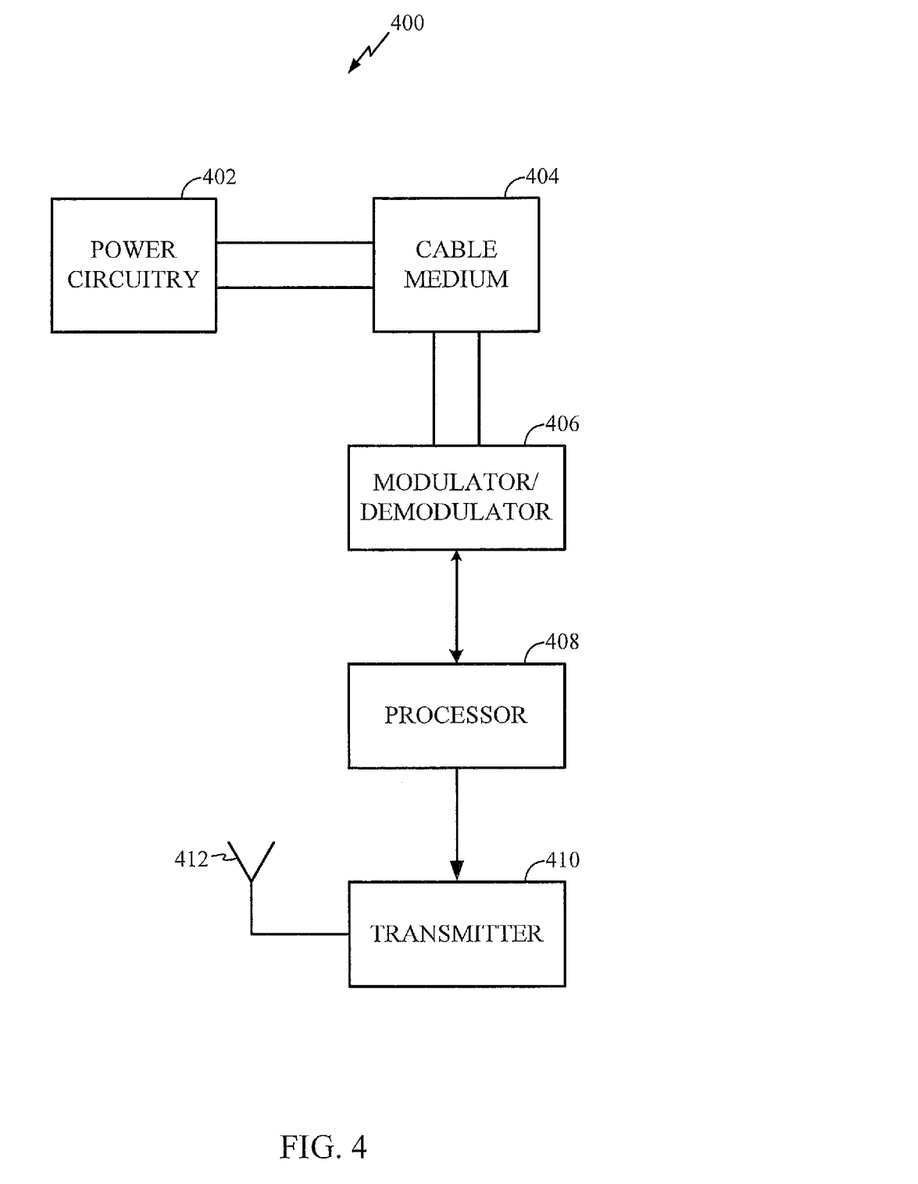
FIG. 4 is a schematic diagram of a beacon device in accordance with an embodiment.

FIG. 4 is a schematic diagram of a beacon transmitter 400 according to an embodiment. Beacon transmitter 400 may provide a particular implementation of at least some aspects of beacon transmitter 104 shown in FIG. 1 or beacon transmitter 210 shown in FIG. 2. A cable medium 404 may comprise a connection to receive a utility grade power signal (e.g., 120V AC at 60.0 Hz) from a wall outlet or through a direct connection to a junction box. Power circuitry 402 may be coupled directly to cable medium 404 to convert the received utility grade power signal to a lower DC voltage, and distribute the converted power signal to other components of beacon transmitter 400. Modulator/demodulator 406 is also connected to cable medium 404 to receive a data signal transmitted over power wires using powerline data transmission techniques discussed above. In a particular implementation, modulator/demodulator 406 may demodulate a signal transmitted in cable medium 404 on a frequency band separate from the utility grade power signal. As pointed out above, a data signal recovered at demodulator 406 may be used to program a processor 408 (e.g., general purpose processor and/or programmable digital signal processor) for configuring beacon transmitter 400. Also, processor 408 may transmit signals through modulator/demodulator 406 to a provisioning entity (e.g., provisioning entity 212) to provide status or diagnostic signals, for example. According to an embodiment, processor 408 may control aspects of operation of transmitter 410 including, for example, determining a transmission power level and/or data to modulate a signal transmitted by transmitter 410. As pointed out by particular example, processor 408 may be programmed to control transmitter 410 to transmit a location of transmitter 410 (e.g., as determined from data obtained at modulator/demodulator 406).

The particular implementation of FIG. 4 shows that beacon transmitter 400 may receive a programming signal at modulator/demodulator 406 to configure processor 408. In an alternative implementation, a beacon transmitter may also include a modulator to transmit messages on a cable medium to implement bi-directional communication (e.g., with a centralized controller or device for configuring beacon transmitters as discussed above).

Figure 5:
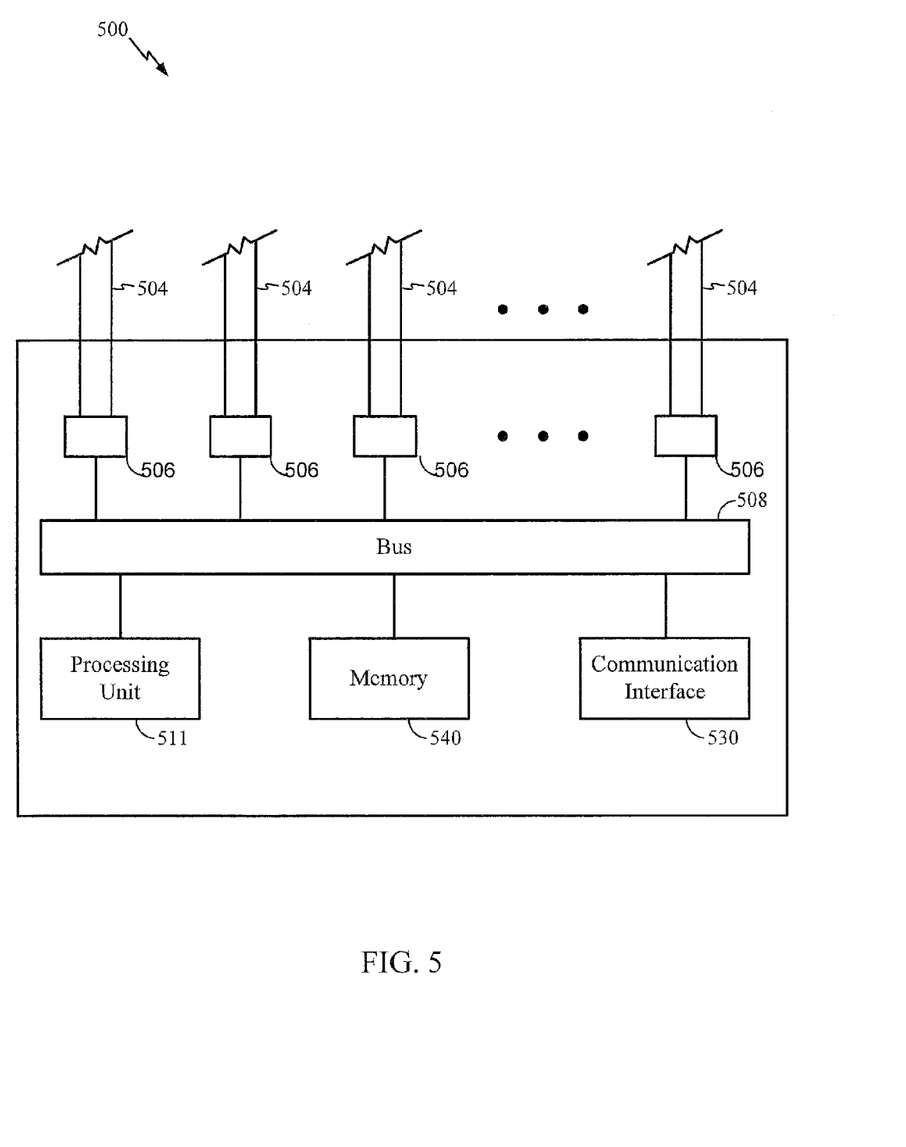
FIG. 5 is a schematic block diagram illustrating an exemplary provisioning entity, in accordance with an implementation.

FIG. 5 is a schematic diagram of a provisioning entity 500 according to an embodiment. Provisioning entity 212 (FIG. 2) may comprise one or more features of provisioning entity 500 shown in FIG. 5. Wirings 504 may be connected to particular wirings that transmit electrical power to utility outlets (e.g., utility outlets 208). As pointed out above, provisioning entity 500 may have a priori knowledge of the locations of utility outlets that are connected to particular wirings 504 (e.g., location of room or adjacent rooms where the utility outlets are located). Modem devices 506 are connected to corresponding wirings 504 to transmit and receive encoded signals using powerline signaling techniques discussed above. Processing unit 511 and 540 may be programmed with machine-readable instructions to provision beacon transmitters connected to provisioning entity 500 through corresponding wirings 504 and modem devices 506. For example, modem devices 506 may be individually addressable by signals on bus 508 to transmit a particular provisioning signal to beacon transmitters connected to the modem devices 506 (e.g., to indicate locations of the beacon transmitters, for example).

A communication interface 530 may allow a technician to program provisioning entity 500 to provision beacon transmitters with, for example, locations of the beacon transmitters, transmission power levels, etc. In one implementation, communication interface may comprise a user interface (e.g., small display and keypad) to receive inputs from a technician to program at communication interface 530 during installation (e.g., during construction or renovation). Alternatively, communication interface 530 may be computed to a communication network (e.g., wireless network or broadband Internet Service) to receive inputs from an external communication device (e.g., through a web interface).

Figure 6:
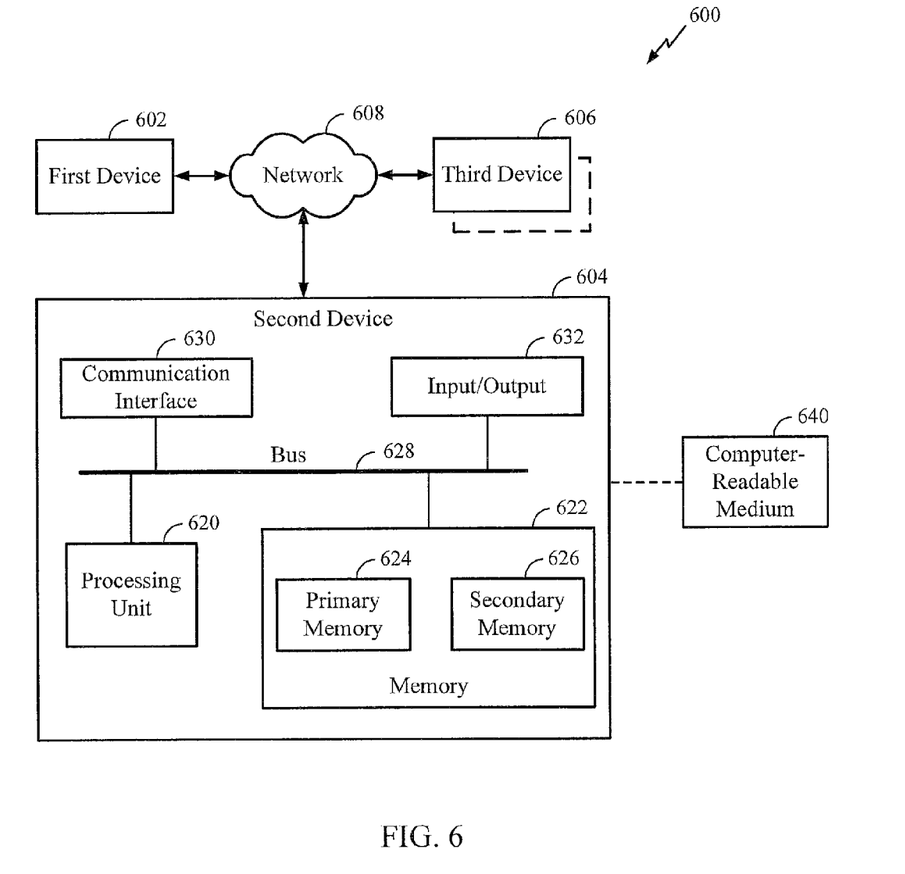
FIG. 6 is a schematic block diagram of an example computing platform in accordance with an implementation.

FIG. 6 is a schematic diagram illustrating an example system 600 that may include one or more devices configurable to implement techniques or processes described above, for example, in connection with FIG. 1. System 600 may include, for example, a first device 602, a second device 604, and a third device 606, which may be operatively coupled together through a wireless communications network 608. In an aspect, first device 602 may comprise a server capable of providing positioning assistance data. Also, in an aspect, wireless communications network 608 may comprise one or more wireless access points, for example. However, claimed subject matter is not limited in scope in these respects.

First device 602, second device 604 and third device 606, as shown in FIG. 6, may be representative of any device, appliance or machine that may be configurable to exchange data over wireless communications network 608. By way of example but not limitation, any of first device 602, second device 604, or third device 606 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 602, 604, and 606, respectively, may comprise one or more of a base station almanac server, a base station, or a mobile device in accordance with the examples described herein.

Similarly, wireless communications network 608, as shown in FIG. 6, is representative of one or more communication links, processes, or resources configurable to support the exchange of data between at least two of first device 602, second device 604, and third device 606. By way of example but not limitation, wireless communications network 608 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 606, there may be additional like devices operatively coupled to wireless communications network 608.

It is recognized that all or part of the various devices and networks shown in system 600, and the processes and methods as further described herein, may be implemented using or otherwise including hardware, firmware, software, or any combination thereof.

Thus, by way of example but not limitation, second device 604 may include at least one processing unit 620 that is operatively coupled to a memory 622 through a bus 628.

Processing unit 620 is representative of one or more circuits configurable to perform at least a portion of a data computing procedure or process. By way of example but not limitation, processing unit 620 may include one or more processors, controllers, microprocessors, microcontrollers, application specific integrated circuits, digital signal processors, programmable logic devices, field programmable gate arrays, and the like, or any combination thereof.

Memory 622 is representative of any data storage mechanism. Memory 622 may include, for example, a primary memory 624 or a secondary memory 626. Primary memory 624 may include, for example, a random access memory, read only memory, etc. While illustrated in this example as being separate from processing unit 620, it should be understood that all or part of primary memory 624 may be provided within or otherwise co-located/coupled with processing unit 620.

Secondary memory 626 may include, for example, the same or similar type of memory as primary memory or one or more data storage devices or systems, such as, for example, a disk drive, an optical disc drive, a tape drive, a solid state memory drive, etc. In certain implementations, secondary memory 626 may be operatively receptive of, or otherwise configurable to couple to, a computer-readable medium 640. Computer-readable medium 640 may include, for example, any non-transitory medium that can carry or make accessible data, code or instructions for one or more of the devices in system 600. Computer-readable medium 640 may also be referred to as a storage medium.

Second device 604 may include, for example, a communication interface 630 that provides for or otherwise supports the operative coupling of second device 604 to at least wireless communications network 608. By way of example but not limitation, communication interface 630 may include a network interface device or card, a modem, a router, a switch, a transceiver, and the like.

Second device 604 may include, for example, an input/output device 632. Input/output device 632 is representative of one or more devices or features that may be configurable to accept or otherwise introduce human or machine inputs, or one or more devices or features that may be configurable to deliver or otherwise provide for human or machine outputs. By way of example but not limitation, input/output device 632 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femto cell, utilized to extend cellular telephone service into a business or home. In such an implementation, one or more mobile devices may communicate with a femto cell via a code division multiple access ("CDMA") cellular communication protocol, for example, and the femto cell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method comprising, at a positioning beacon transmitter:
   registering said positioning beacon transmitter in response to receipt of one or more probe signals from a provisioning entity, said one or more probe signals to discover beacon nodes connected to a power distribution network, said one or more probe signals being received from a cable medium connected to a utility-grade power source;
   receiving an alternating current power signal from a utility-grade power source over said cable medium;
   receiving a provisioning signal from said provisioning entity over said cable medium, said provisioning signal comprising an indication of a location of said positioning beacon transmitter; and
   configuring said positioning beacon transmitter to transmit a beacon signal modulated, at least in part, by said indication of said location of said positioning beacon transmitter.

2. The method of claim 1, wherein the provisioning signal comprises one or more of a unique identifier, absolute transmitter position, relative transmitter position, civic address, altitude or floor number.

3. The method of claim 1, and further comprising configuring said positioning beacon transmitter to transmit said beacon signal modulated, at least in part, an indication to adjust a transmission power of said beacon signal.

4. The method of claim 3, wherein said configuring said positioning beacon transmitter further comprises indicating to transition said positioning beacon transmitter from a powered-off state to a powered state at a particular specified transmission power level.

5. The method of claim 3, wherein said configuring said beacon transmitter further comprises indicating to transition from a powered-off state.

6. The method of claim 1, wherein receiving the alternating current power signal comprises receiving the alternating current power signal from a utility wall socket.

7. A positioning beacon transmitter comprising:
power circuitry to be connected to a cable medium to receive a utility-grade alternating current power signal and to register said positioning beacon transmitter with a provisioning entity responsive to receipt of one or more probe signals, said one or more probe signals to discover said positioning beacon transmitter;
a demodulator to be connected to said cable medium to demodulate a data signal received on said cable medium;
a wireless transmitter to transmit a beacon signal; and
a processor to configure said wireless transmitter, in response to said demodulated data signal, to transmit said beacon signal modulated, at least in part, by an indication of a location of said positioning beacon transmitter in said data signal.

8. The positioning beacon transmitter of claim 7, wherein said demodulated data signal is transmitted on said cable medium on a frequency band substantially isolated from said alternating current power signal.

9. The positioning beacon transmitter of claim 7, wherein the indication of said location comprises one or more of a unique identifier, absolute transmitter position, relative transmitter position, civic address, altitude or floor number.

10. The positioning beacon transmitter of claim 7, wherein said processor is further to configure said wireless transmitter, in response to said demodulated data signal to configure said positioning beacon transmitter to transmit said beacon signal modulated, at least in part, an indication to adjust a transmission power of said beacon signal.

11. The positioning beacon transmitter of claim 7, wherein the indication of said location comprises one or more of a unique identifier, absolute transmitter position, relative transmitter position, civic address, altitude or floor number.

12. A non-transitory storage medium comprising machine-readable instructions stored thereon which are executable by a special purpose computing apparatus of a positioning beacon transmitter to:
register said positioning beacon transmitter in response to receipt of one or more probe signals from a provisioning entity, said one or more probe signals to discover beacon nodes connected to a power distribution network, said one or more probe signals to be received from a cable medium connected to a utility-grade power source;
obtain a provisioning signal received from said provisioning entity over said cable medium connected to said utility-grade power source, the provisioning signal comprising an indication of a location of the positioning beacon transmitter; and
configure the positioning beacon transmitter to transmit a beacon signal modulated, at least in part, by the indication of the location of the positioning beacon transmitter.

13. An apparatus comprising:
means for registering a positioning beacon transmitter in response to receipt of one or more probe signals from a provisioning entity to discover beacon nodes connected to a power distribution network, said one or more probe signals being received from a cable medium connected to a utility-grade power source;
means for receiving an alternating current power signal from said utility-grade power source over said cable medium;
means for receiving a provisioning signal from said provisioning entity over said cable medium, said provisioning signal comprising an indication of a location of said positioning beacon transmitter; and
means for configuring said positioning beacon transmitter to transmit a beacon signal modulated, at least in part, by said indication of said location of said positioning beacon transmitter.

14. A method comprising, at a provisioning entity:
discovering one or more positioning beacon transmitters, connected to wires, responsive to receipt, by said one or more positioning beacon transmitters, of one or more probe signals from said positioning entity, said wires being utilized to register said one or more positioning beacon transmitters and to transmit an alternating current power signal using a utility-grade power source within a building;
determining one or more commands for configuring said one or more positioning beacon transmitters;
modulating said one or more commands for transmission over said wires; and
transmitting said one or more commands as one or more provisioning signals over said wires to said one or more positioning beacon transmitters, said one or more provisioning signals comprising an indication of locations of said one or more positioning beacon transmitters.

15. The method of claim 14, wherein the indication of said locations comprises one or more of a unique identifier, absolute transmitter position, relative transmitter position, civic address, altitude or floor number.

16. The method of claim 14, wherein said one or more provisioning signals further comprise an indication to adjust a transmission power of one or more beacon signals transmitted from said one or more positioning beacon transmitters.

17. The method of claim 16, further comprising indicating to said one or more positioning beacon transmitters to transition from a powered-off state to a powered state at a particular specified transmission power level.

18. The method of claim 16, further comprising indicating to transition from a powered-off state.

19. An apparatus comprising:
a transceiver to broadcast one or more probe signals to discover one or more positioning beacon transmitters and to receive registration signals from said one or more positioning beacon transmitters, said transceiver additionally transmit data signals over wires for transmission of an alternating current power signal as utility-grade power source within a building; and
a processor to:
determine one or more commands for configuring one or more positioning beacon transmitters; and
initiate transmission of said one or more commands as one or more provisioning signals over said wires to said one or more positioning beacon transmitters, said one or more provisioning signals comprising an indication of locations of said one or more positioning beacon transmitters.

20. The apparatus of claim 19, wherein the indication of said location comprises one or more of a unique identifier, absolute transmitter position, relative transmitter position, civic address, altitude or floor number.

21. The apparatus of claim 19, wherein said one or more provisioning signals further comprise an indication to adjust a transmission power of one or more beacon signals transmitted from said one or more positioning beacon transmitters.

22. The apparatus of claim 21, wherein wherein said processor is additionally to indicate to transition from an powered-off state to powered state at a particular specified transmission power level.

23. The apparatus of claim 21, wherein said processor is additionally to indicate to said one or more positioning beacon transmitters to adjust a transmission power from a powered-off state.

24. A non-transitory storage medium comprising machine-readable instructions stored thereon which are executable by a special-purpose computing apparatus to:
   broadcast using wires for transmission of an alternating current power signal as a utility-grade power source within a building, one or more probe signals to discover one or more positioning beacon transmitters and to receive registration signals from said one or more positioning beacon transmitters;
   determine one or more commands for configuring one or more positioning beacon transmitters; and
   initiate transmission of said one or more commands as one or more provisioning signals over said wires for transmission of said alternating current power signal as said utility-grade power source within said building to said one or more positioning beacon transmitters, said one or more provisioning signals comprising an indication of locations of said one or more positioning beacon transmitters.

25. An apparatus comprising:
   means for discovering one or more positioning beacon transmitters and utilizing wires for transmission of an alternating current power signal, said discovering to be in response to said one or more positioning beacon transmitters receiving probe signals from a provisioning entity and transmitting registration signals responsive to said received probe signals;
   means for determining one or more commands for configuring said one or more positioning beacon transmitters;
   means for modulating said one or more commands for transmission over said wires for transmission of said alternating current power signal as utility-grade power source within a building; and
   means for transmitting said one or more commands as one or more provisioning signals over said wires to said one or more positioning beacon transmitters, said one or more provisioning signals comprising an indication of locations of said one or more positioning beacon transmitters.

* * * * *